United States Patent [19]

Shaffer et al.

[11] Patent Number: 4,847,804
[45] Date of Patent: Jul. 11, 1989

[54] APPARATUS AND METHOD FOR DATA COPY CONSISTENCY IN A MULTI-CACHE DATA PROCESSING UNIT

[75] Inventors: Stephen J. Shaffer, Harvard, Mass.; Richard A. Warren, Austin, Tex.

[73] Assignee: Digital Equipment Corporation, Maynard, Mass.

[21] Appl. No.: 166,814

[22] Filed: Mar. 1, 1988

Related U.S. Application Data

[63] Continuation of Ser. No. 698,364, Feb. 5, 1985, abandoned.

[51] Int. Cl.[4] ............................................. G06F 9/00
[52] U.S. Cl. ................................................... 364/900
[58] Field of Search ............................... 364/200, 900

[56] References Cited

U.S. PATENT DOCUMENTS

| | | | |
|---|---|---|---|
| 4,228,503 | 10/1980 | Waite et al. | 364/200 |
| 4,322,795 | 3/1982 | Lange et al. | 364/200 |
| 4,385,351 | 5/1983 | Matsuura et al. | 364/200 |
| 4,394,731 | 7/1983 | Flusche et al. | 364/200 |
| 4,410,944 | 10/1983 | Kronies | 364/200 |
| 4,426,681 | 1/1984 | Bacot et al. | 364/200 |
| 4,471,429 | 9/1984 | Porter et al. | 364/100 |
| 4,484,267 | 11/1984 | Fletcher | 364/200 |
| 4,622,631 | 11/1986 | Frank et al. | 364/200 |

Primary Examiner—Gareth D. Shaw
Assistant Examiner—John G. Mills
Attorney, Agent, or Firm—William W. Holloway; Richard J. Paciulan

[57] ABSTRACT

In a multi-processor unit data processing system, apparatus and method are described for providing that only the most recent version of any data signal group will be available for manipulation by a requesting data processing unit. A "multiple" state for a data signal group is defined by the presence of a particular data signal group stored in the cache memory units of a plurality of data processing units. The "multiple" state is associated with each copy of a data signal group by control signals. When a data signal group is changed by the local data processing unit, an "altered" state is associated with the new data signal group. The simultaneous presence of an "altered" state and "multiple" state is forbidden and requires immediate response by the data processing system to insure consistency among the data signal groups. In addition to apparatus for identifying and storing the state of the data signal groups, apparatus must be provided for communication of the selected states to the data processing units.

6 Claims, 4 Drawing Sheets

STATES OF DATA IN CACHE MEMORY UNIT

CONTROL BIT SIGNALS

| VALID | ALTERED | MULTIPLE |
|---|---|---|

STATE 1: DATA NOT IN CACHE OR INVALID DATA IN CACHE — | 0 | 0 | 0 |

STATE 2: VALID DATA IN CACHE — | 1 | 0 | 0 |

STATE 3: DATA IN CACHE ALTERED BY ASSOCIATED PROCESSOR — | 1 | 1 | 0 |

STATE 4: DATA IN CACHE WITH COPIES IN OTHER CACHE UNITS — | 1 | 0 | 1 |

STATE 5: (FORBIDDEN) DATA IN CACHE ALTERED BY ASSOCIATED PROCESSOR WITH DATA IN OTHER CACHES — | 1 | 1 | 1 |

ADDRESS BUS SIGNAL GROUP

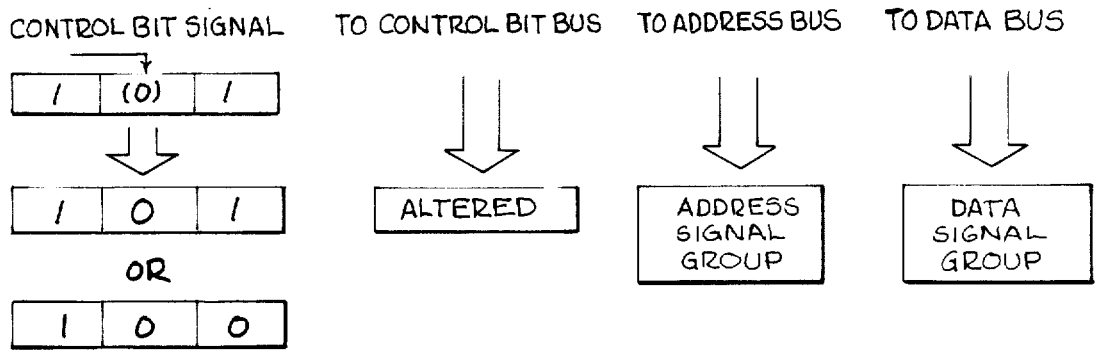

RESPONSE TO ADDRESS BUS SIGNAL GROUPS
SITUATION 1: DATA SIGNAL GROUP NOT IN CACHE MEMORY UNIT (OR INVALID)
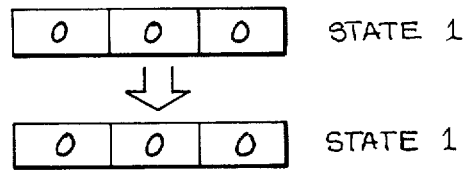
SITUATION 2: DATA SIGNAL GROUP REQUESTED BY LOCAL DATA PROCESSING UNIT
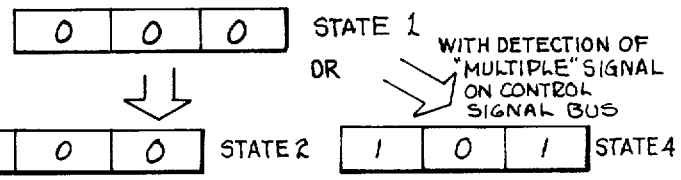
SITUATION 3: DATA SIGNAL GROUP IN CACHE MEMORY UNIT
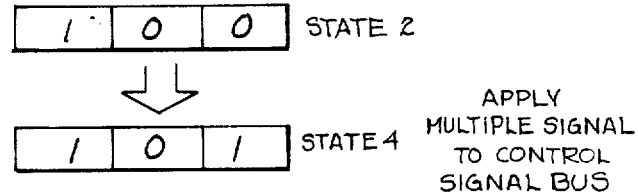
SITUATION 4: DATA SIGNAL GROUP IN CACHE WITH "ALTERED" SIGNAL ON CONTROL SIGNAL BUS.
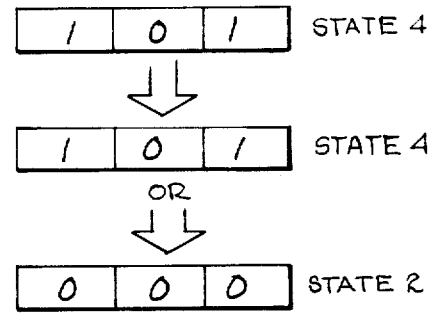
fig. 6

APPARATUS AND METHOD FOR DATA COPY CONSISTENCY IN A MULTI-CACHE DATA PROCESSING UNIT

This is a continuation of co-pending application Ser. No. 698,364, filed on Feb. 5, 1985, now abandoned.

RELATED APPLICATIONS

Apparatus and Method for Prohibiting Access in a Multi-Cache Data Processing System to Data Signal Groups being Manipulated by a Data Processing System invented by Thomas W. Eggers, Stephen J. Shaffer and Richard A. Warren, Ser. No. 06/698,366, filed Feb. 5, 1985 and assigned to the assignee named herein.

Apparatus and Method for Improving System Bus Performance in a Data Processing System having a Plurality of Data Processing Units by Stephen J. Shaffer, Richard A. Warren, Thomas W. Eggers and William D. Strecker, Ser. No. 06/698,399, filed on Feb. 5, 1985 and assigned to the assignee named herein.

BACKGROUND OF THE INVENTION

1. Field of the Invention

This invention relates generally to data processing systems and, more particularly, to data processing systems having at least one cache memory unit. The use of cache memory units can result in storage of a data signal group in a plurality of locations. Each copy of a data signal group stored throughout the data processing system must be equivalent. Otherwise procedures must be instituted to avoid inconsistent results that can arise from independent manipulation of the copies of a data signal group by the components of the data processing system.

2. Description of the Related Art

It is known in data processing systems having the possibility of multiple copies of a data signal group, such as can occur when cache memory units are used with associated data processing units, to provide that one copy of the data signal group is the master copy of the data signal group and any changes in the data signal group are immediately communicated to master copy. At the same time, other copies of the data signal group can be invalidated when any change in the data signal group is identified. The invalidation of the data signal group is typically performed by changing the state or logic level of stored control signals associated with each stored entry of the non-master data signal groups. The associated stored control signals are sometimes referred to as tag signals, however tag signals can also have other meanings in the computer art. Any access of the cache memory unit data signal group by the associated data processing unit can result in the appropriate control signal state being interrogated and a determination made as to the validity of the data group. If the data signal group is not valid, the signal group is unavailable to the associated data processing unit.

This procedure can suffer from several disadvantages. The most important disadvantage arises because many implementations of this procedure require that duplicate cache directories be associated with each data processing system so that entries of each cache memory unit are known and data signal groups stored in every cache memory unit can be identified. While the duplicate directories can limit the required bus activity, the duplicate cache directories must have a plurality of communication paths to update the related control signals when data signal groups are being altered. Thus, this technique of data signal group verification is complex and requires additional apparatus in its implementation.

Similarly, related procedures identify one data signal group, typically the main memory data signal group, as being the "correct" signal group. This procedure requires that when a data group is updated, it must be stored in the main memory and then extracted when a data processing unit requires the data signal group. The main memory access is typically longer than a cache memory access and an undesirable increase in system bus traffic can result from this procedure.

A need has therefore been felt for a data processing system with multiple cache memory units, that has reduced system bus activity while providing an efficient procedure for the indivivdual data processing units, associated with each cache memory unit, to acquire the preferred copy of a requested data signal groups.

SUMMARY OF THE INVENTION

It is therefore an object of the present invention to provide aparatus and method for an improved data processing system.

It is another object of the present invention to provide apparatus and method for an improved data processing system with multiple data processing units.

It is still another object of the present invention to provide a method and apparatus for maintaining equivalent copies of a data signal group in a plurality of locations in a data processing system.

It is a more particular object of the present invention to provide a plurality of control signals for each data signal group, the control signals defining a plurality of states for each data signal group.

It is another particular object of the present invention to provide apparatus and method for identifying an availability of a data signal group that is stored in a plurality of locations in a data processing system.

It is yet another particular object of the present invention to ensure all copies of a data signal group accessible to the data processing units of a data processing system are equivalent.

The aforementioned and other objects are accomplished, according to the present invention, by a data processing system having a plurality of data processing units. Each of the data processing units has an associated cache memory unit, each cache memory unit having address comparison means, means for storing data signal groups, means for storing address signal groups, and means for storing a plurality of control signals associated with each data signal group. The data signal group states that are defined in cache memory unit include: a vacant state, wherein the data group is not present in the cache memory unit or is not valid; a valid state, wherein only one cache memory unit has the data signal group stored therein; an altered state, wherein the signal group has been altered by the associated data processing unit and returned to a storage location defined by the same address; and a multiple state wherein the signal group is stored in a plurality of cache memory units. The data processing system will not allow a data signal group state wherein a data signal group is stored in a plurality of data processing system locations and the data signal group is altered in one location. With the defined states and the ability to communicate selected control signals throughout the entire data processing system, an accurate copy of the data signal group can be maintained in all cache memory units as well as in the main memory.

These an other features of the invention will be understood upon the reading of the following discussion along with the figures.

BRIEF DESCRIPTION OF THE DRAWINGS

FIG. 4 is a summary of the basic states of data signal groups stored in the cache memory unit.

FIG. 5 is a summary of the cache memory unit activity resulting from an attempt by a data processing unit to store an altered data signal group in an associated cache memory unit when the data signal group is currently stored in other cache memory units.

FIG. 6 is a summary of the response of the cache memory unit to address signal groups on the address bus for control signal groups.

DESCRIPTION OF THE PREFERRED EMBODIMENT

Detailed Description of the Drawings

Figure 1:
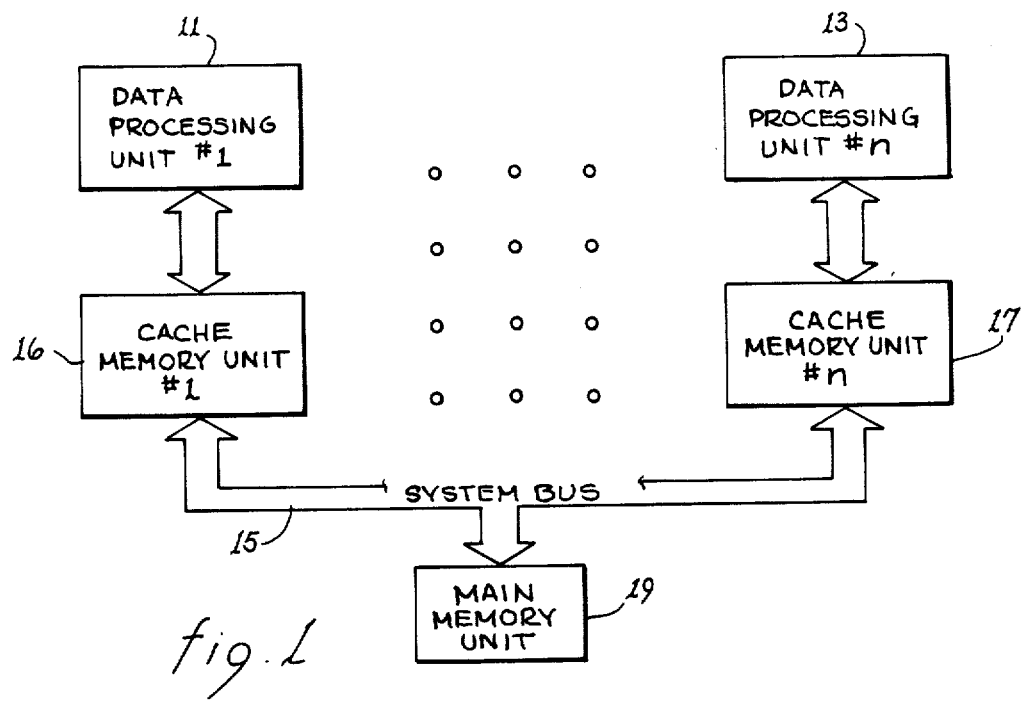
FIG. 1 is a block diagram of a data processing system having a plurality of data processing units and associated cache memory units.

Referring to FIG. 1, a block diagram of a data processing system having a plurality of data processing units is shown. The plurality of data processing units, data processing unit #1, 11, through data processing unit #n, 13, perform the manipulation of data signal groups under control of at least one system program. Cache memory unit #1, 16, is coupled to data processing unit #1, 11, and cache memory unit #n, 17, is coupled to data processing unit #n, 13. Similarly, other data processing units, not shown, can be coupled to associated cache memory units. All of the cache memory units are coupled to a system bus 15 and the system bus 15 is in turn coupled to main memory unit 19.

Figure 2B:
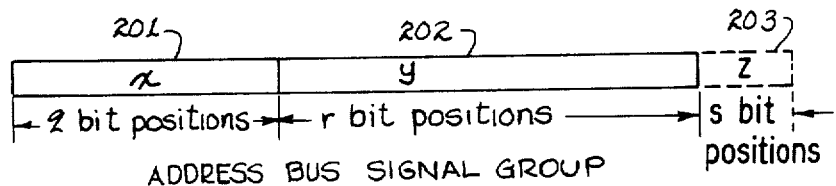
FIG. 2b is a representation of the address signal group the address signal subgroups as required for use by a cache memory unit.
Figure 2A:
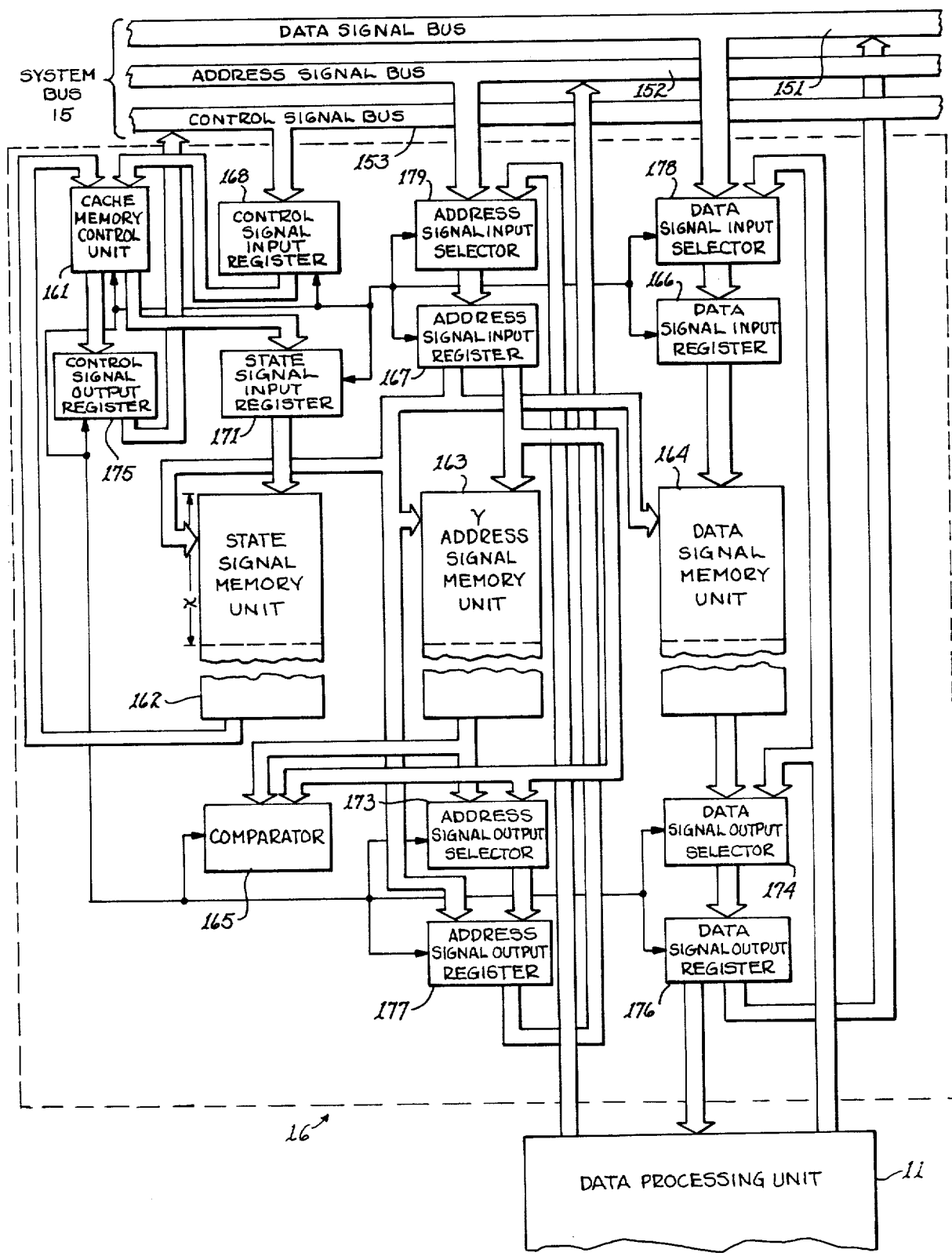
FIG. 2a is a block diagram of a cache memory unit capable of utilizing the instant invention.

Referring to FIG. 2a, the system bus is shown as including three sub-buses, a data signal bus 151, an address signal bus 152, and a control signal bus 153. Memory unit 16 is coupled to the system bus 15 and to the data processing unit 11 as follows. Control signal input register 168 receives signals from control signal bus 153, and applies signals to cache memory control unit 161. Cache memory control unit 161 applies signals to control signal output register 175 and to state signal input register 171. State signal input register 171 applies signals to state signal memory unit 162. State signal memory unit 162 applies signals to cache memory control unit 161. Control signal output register 175 applies signals to control signal bus 153. Address signal input selector 179 receives signals from address signal bus 152 and from data processing unit 11 and applies signals to address signal input register 167. Address signal input register 167 applies signals to state signal memory unit 162, to y-address memory unit 163, to data signal memory unit 164, to address signal output selector 173, to comparator 165 and to address signal output register 177. Address signal output selector 173 and comparator 165 also receive signals from y-address signal memory unit 163. Address signal output register 177 also receives signals from address signal output selector 173 and applies signals to address signal bus 152. Data signal input selector 178 receives signals from data signal bus 151, and data processing unit 11. Data signal unit register 166 receives signals from data signal input selector 178 and applies signals to data signal memory unit 164. Data signal output selector 174 receives signals from data signal memory unit 164 and from data processing unit 11 and applies signals to data signal output register 176. Data signal output register 176 applies signals to data processing unit 11 and to data signal bus 151. The cache memory control unit 161 is coupled to data processing unit 11, to control signal output register 175, to control signal input register 168, to comparator 165, to address signal output selector 173, to address signal output register 177, to data signal output selector 174, to data signal output register 176, to state signal input register 171, to address signal input selector 179, to address signal input register 167, to data signal input selector 178, and to data signal input register 166.

Referring to FIG. 2b, the structure of the address signal groups is defined. For purposes of description of the present invention, the address data signal group is divided in to three subgroups; an x-address signal group 201 having q logic signal positions, a y-address signal group 202 having r logic signal positions, and a z-address signal group 203 having s logic signal positions. The x-address signal group 201 defines a physical location of signal groups in the cache memory signal storage components. The y-address signal group 202 is the portion of the address signal group stored in address signal group memory unit 163 at the x position when the data signal group corresponding to the address (x+y) is stored in the data signal group memory unit 164. The z-group signal is an address signal group 203 portion that is redundant when plurality of basic data signal groups (e.g. words) are transferred on the system bus simultaneously and identified by a single address signal group.

Figure 3:
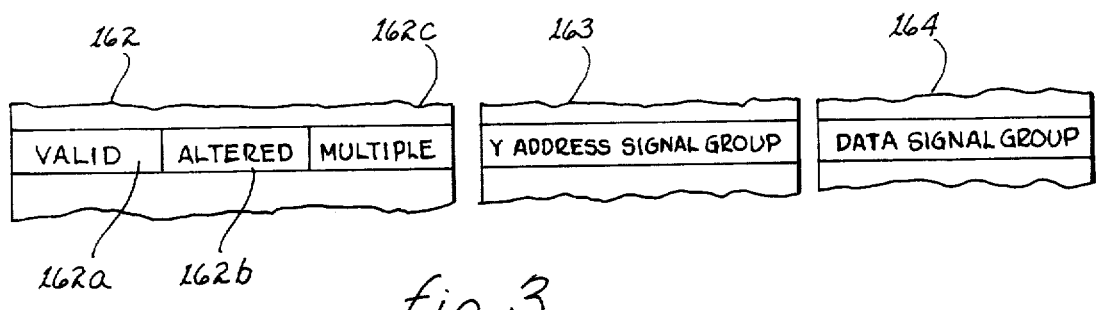
FIG. 3 defines the plurality of memory locations in a cache memory unit simultaneously accessed by each x-address signal subgroup.

Referring to FIG. 3, the various signals and signal groups associated with and addressed by the x-address signal group, when an address signal is applied to a cache memory unit, are shown. In the state signal memory unit 162, a valid signal position 162a, an altered signal position 162b and a multiple signal position 162c are shown. In the y-address signal group memory unit 163, a y-address group is addressed. And in data signal group memory unit 164, a data signal group is addressed by a x-address signal group.

Referring to FIG. 4, a summary of the states describing a data signal groups in the cache memory unit of the data processing system of the instant invention is shown. Along with a description of the states is a symbolic representation of the signals in a control signal memory unit 162 defining these states. State 1, and indeed the intital state of all cache memory units in a data processing system, occurs when a location associated with the group of control signals does not have a data signal group in the associated data signal memory location, the data signal group therein being comprised of random data signals or is comprised of a data signal group that has been determined to be invalid. State 1 is interpreted by the data processing system associated with the cache memory unit as an empty memory location in the cache memory unit. State 2 is present when a valid data signal group is stored in the associated data signal group memory unit location. State 3 indicates that the data signal group having a predefined address has been accessed by the associated data processing unit, has been altered, and has been replaced in the memory location in the cache memory unit. State 4 provides an indication that the data signal group memory location associated with the control signal register stores a data signal group that is also stored in at least one other cache memory unit and is identified by the identical address. State 5 is a state of the data signal group that is not allowed by the data processing system and defines the situation where the data signal group in data signal group memory unit 162 location associated with the control signal register cells is held in at least one additional cache memory unit, that the data signal group has been accessed by the associated data processing unit and has been altered, and that the altered data signal group has been returned to the same data signal group memory unit location.

Referring to FIG. 5, the activity that results from an attempt to assert the unpermitted State 5 of FIG. 4 is summarized. The control signal memory unit locations assert either State 1 (not shown), State 4 or State 2 depending on the programmed response of the data processing unit to the attempt to assert State 5. State 4 indicates that the other versions of the data have been corrected and are still in the various cache memory units. State 2 indicates that the copies of the data in other cache memories have been rendered inaccessible or more accurately, invisible to the associated data processing unit by removal of the valid data bit from the associated state signal memory unit register cell. State 1 indicates that the altered data has been determined to be invalid and that the memory location is considered to be empty. To implement the architecture associated with State 2 or State 4, the address of the altered data is applied to the control bus and the altered data signal group is applied to the data signal bus. In the preferred embodiment, a "write" signal is asserted prior to communication of the address. The presence of the altered data control signal permits all other cache memory units to invalidate or to update the data signal group at the corresponding cache unit address. The main memory signal group is similarly updated at this time. It will be clear that for State 3, the architecture of the data processing system can support a delayed updating of the associated date signal group in the main memory. The problem present when other cache memory units store copies of non-updated data signal groups is not present here, because a cache memory unit requiring data at that address must communicate on the system bus.

Referring now to FIG. 6, the response of the cache memory unit to an address identified on the address signal group bus is illustrated. With respect to situation 1, the address on the address signal bus does not correspond to an address having an associated valid data signal group in the local cache memory unit. In this situation, the cache memory unit does not change state signals. Referring to situation 2, the address on the address signal bus corresponds to an address of data requested by the local cache memory unit. In this case, the cache memory unit stores the associated data and changes the control signal bit to State 2. If a "multiple" signal is asserted on the control signal bus when the address signal group is applied to the address signal group bus 152, the control register cells signals of state signal memory unit 162 are placed in State 4, indicating copies of the data exist in at least one additional cache memory unit. With respect to situation 3, the local cache memory unit identifies an address on the address signal bus as being identified with a data signal group stored in the cache memory unit. In this case, the control storage bits are changed to State 4 and a "multiple" signal asserted by the local cache memory unit on the control signal bus to insure that State 4 is applied to control register cells of the cache memory unit requesting and receiving the data signal group. Referring now to situation 4, the address, signal group on the address signal bus and an "altered" signal on the control signal bus causes the cache memory unit to place the control signal bits in State 4 or, as indicated in the discussion of FIG. 5, to invalidate the data in the local cache memory unit in the local cache memory and place the associated control signal bits in State 1.

OPERATION OF THE PREFERRED EMBODIMENT

Detailed Description of the Drawings

Referring once again to FIG. 1, it will be understood that the cache memory units shown as separate entities are frequently implemented as part of the data processing unit. The cache memory unit is a local memory for temporarily storing data signal groups that are more readily available to the associated data processing unit than are the data signal groups in the main memory. In the present invention, the cache memory unit can operate in the "write back" or "write thru" mode of operation. This type of cache memory unit is distinquished by the mode of operation in which the result of every associated data processing unit operation is stored into the cache memory unit.

The cache illustrated in FIG. 2a and FIG. 2b has another feature common to cache memory units. The address is divided into three parts. The first part (labeled x in FIG. 2b) defines a physical location in the cache memory submits. When an address signal group is stored in address signal input register and applied to the memory units, a location is addressed in the y-address signal group register and signal group at the location defined by the x-signal group will be placed in the comparator. The y-address signal group from the memory location can be compared with the y-address signal group of address signal input register 167. If these addresses are the same, the result is communicated to the cache control unit 161. The least significant signal bits are typically omitted when the data bus can transfer a plurality of basic data signal groups. For example, if the data signal groups are comprised of signal groups usually referred to as words and the data signals groups are always transferred in groups of two words, the final data bit can be omitted in the address (for purposes relevant to the instant invention). Similarly, if four words of data signals are identified by a single address, the final or some other defined location of two address signals can be omitted. The operation of the cache memory unit is thus complicated by the use of first two subgroups of the address signal group. To determine if a data signal group is stored in the cache memory, it is first necessary to determine when the associated address signal group is stored in the cache memory unit. An address signal group is therefore entered in address signal input register 167. The x-portion 201 of the address signal group is applied to the addressing mechanism of y-address signal memory unit 163. The contents of the physical location in memory unit 163 are applied to comparator 165 along with the y-address portion of the address signal group in address register 167. If the two y-address signal groups are identical, then the associated data signal group is stored in data signal group memory unit 164. However, the control bit signal register is simultaneously addressed at the x-address signal group 201 position. If the valid data bit is not asserted and even if the address comparison is positive, the data signal group is not available and, the interrogation of the cache memory unit by the asociated data processing unit is described as a "miss", the data processing unit interpreting the lack of a valid signal as an empty data signal group memory unit location. It will be clear that each address signal group asserted on the address signal bus must be interrogated by the cache memory unit in order to identify that "multiple" or "altered" conditions are present in the data processing unit.

It will be clear that programs are typically clustered in an address space. A plurality of y-address signal group registers and associated data signal group registers can permit storage in the cache of a plurality of data signal groups with the same x-address signal groups. This technique requires increased storage apparatus as well as a more complex comparison procedure. A "hashing" algorithm can be utilized when a plurality or multiplicity of physical memory units is not practical. A "hashing" procedure provides a method of redefining address signal groups so that the normally clustered addresses are distributed throughout the memory address space. Still another technique to prevent address clustering is to use some internal portion of an address signal group as the x-address signal group. The present invention will function with any of these and other addressing techniques.

The cache memory unit 16 has the capability for receiving address signal groups from the address signal bus 152 and for applying signals to the address signal bus 152. In addition, the cache memory unit 16 can retrieve data signal groups from the data signal bus 151 and can apply data signal groups to the data signal bus 151. Similarly, control signals can be received from and applied to the control signal bus 153 by the cache memory unit 16. And the cache memory unit 16 can supply requested data to the associated data processing unit 11, and can store data signal groups from the data processing unit 11.

The function of the apparatus added to the data processing system to implement the storage of signal groups designating the states of associated data signal groups described by the present invention, is to ensure that each data processing unit has available for manipulation only the most recent version of a data signal group. The assumption is made by the data processing system implementation that the most recent version of the data signal group is the "correct" version. Other assumptions concerning the "correct" version can be supported by the apparatus of the instant invention.

The multiple locations in which the data signal groups can be stored, i.e. in the cache memory units associated with the data processing units and in the main memory, are of concern in cache memory systems wherein data signal groups from the data processing unit are written back into the cache memory unit. The problem relates to the situation where an updated version of a data signal group can exist in one of a plurality of cache memory units while another cache memory unit can contain a "prior" version of the data signal group. To prevent the occurrence of different versions of a data signal group being stored in cache memory units, the data processing unit, attempting to store an altered data signal in the associated cache memory unit, will temporarily store the altered data signal group in the data processing unit until access to the system bus is obtained. The "altered" or "write" signal, applied to the control signal bus by the local cache memory unit, informs all other cache memory units and the main memory that the data signal group associated with the address placed on the address signal bus is no longer the correct "version" of the data. If the data signal group resides only in the main memory in addition to the local cache memory unit, then there is no urgency to correct this copy of data signal group. This lack of urgency is a result that any data processing unit requesting a data signal group must use the system bus. The address signal group asserted on the system bus for aquisition of the data signal group will be interrogated by every cache memory unit and the correct "version" of the data signal group can be applied to the system bus. Thus the requesting cache memory unit will receive a "correct" version of the data signal group.

When more than one cache memory unit has a copy of the data signal group and one of the duplicated data signal groups is to be updated, it is necessary to correct all copies of the data signal group before the storage of the altered signal group in the local cache memory unit. Thus the local cache memory unit must be aware that multiple copies exist. The "multiple" control signal bit is asserted by a local cache memory unit when a data signal group stored therein is requested by another data processing unit. The presence of the multiple signal in a local cache memory unit causes the local cache memory unit to signal, via the "write" signal on the control bus, that the associated data signal group(s) must be updated in each of the other cache memory units containing a copy of the data signal group. The updating is performed as soon as the data processing unit cache memory unit can gain access to the bus and prior to storage of the altered data signal group in the associated cache memory unit. Thus all copies are updated as soon as possible within the restrictions of the architecture of the data processing system.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A cache memory unit for use in a data processing system, said data processing system including a plurality of data processing units coupled to a system bus, each data processing unit having a cache memory unit with a write back or write thru mode of operation whereby the result of every associated data processing unit operation is stored into the cache memory unit associated therewith, comprising:
   a plurality of addressable storage locations for storing signal groups identified by and associated with an address signal group;
   a status register means associated with each of said locations for storing status signals identifying parameters of a signal group stored in said associated locations;
   activity means for applying an associated address signal group to said system bus for each signal group in said main memory unit retrieved by said associated data processing unit, said activity means for applying a first first control signal and an associated address signal group to said system bus for each signal group altered by said associated data processing unit, said activity means for applying a second control signal to said system bus when data processing unit not associated with said cache memory unit retrieves a signal group from said main memory unit also stored in said cache memory unit; and update means coupled to said system bus and responsive to address signal groups to said control signals applied to said system bus for changing status signal in said status register associated for signal groups stored in said cache memory unit.

2. The cache memory unit of claim 1 wherein said update means changes said status signals associated with a signal group when said signal group is retrieved by said associated data processing unit.

3. The cache memory unit of claim 2 wherein said status signals indicate when a signal group associated therewith includes a valid signal group, when a signal group associated therewith has been altered and when a signal group associated therewith is stored in a plurality of cache memory units.

4. The cache memory unit of claim 3 wherein status signals associated with a signal group can designate altered data is stored in only one cache memory unit.

5. The cache memory unit of claim 4 wherein said status signals can not designate that said associated signal group is altered and stored in a plurality of locations simultaneously.

6. The cache memory unit of claim 1 wherein said activity means applies a first control signal to said system bus when a non-associated data processing unit attempts to retrieve a signal group from said main memory unit when said cache memory unit has an altered instance of said signal group.

* * * * *